Dec. 2, 1952          O. LEROY          2,619,940
DRY GAS METER WITH TWO BELLOWS AND TWO MEASURING CHAMBERS
Filed May 17, 1947
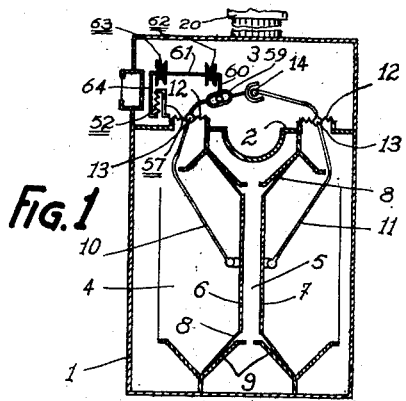
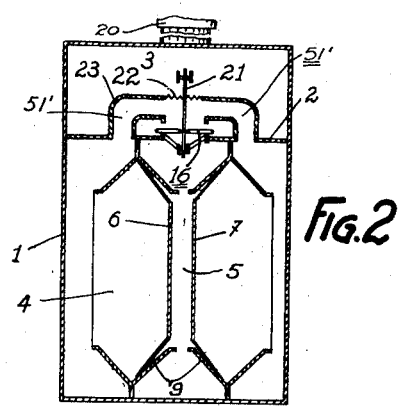
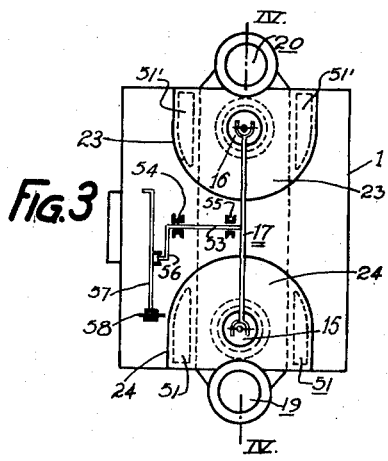
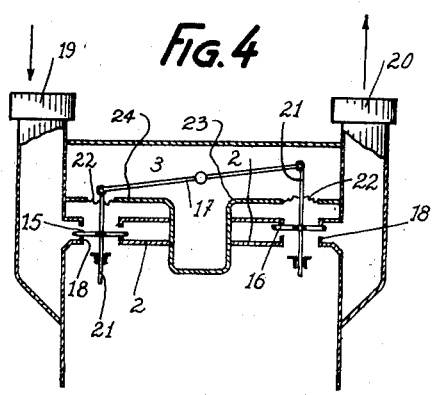
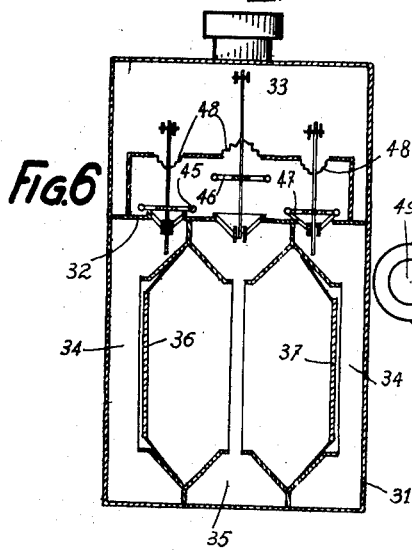
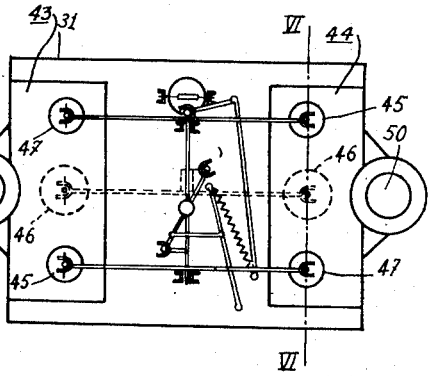
Inventor:
Octave Leroy
By Hinkley, Horton, Ellsberg, Housmann & Wupper
Atty's.

Patented Dec. 2, 1952

2,619,940

UNITED STATES PATENT OFFICE 2,619,940

DRY GAS METER WITH TWO BELLOWS AND TWO MEASURING CHAMBERS

Octave Leroy, Paris, France, assignor to Société Anonyme dite: Compagnie pour la Fabrication des Compteurs et Materiel d'Usine à Gaz, Montrouge, France Application May 17, 1947, Serial No. 748,751
In France November 22, 1943

Section 1, Public Law 690, August 8, 1946
Patent expires November 22, 1963

3 Claims. (Cl. 121—48)

My present invention has for its object a dry gas meter with two bellows and two measuring chambers and its distributing mechanism.

In the meter according to my invention the casing is divided by means of a substantially horizontal partition, the top compartment containing the entire clock work and distributing system, while the bottom compartment contains two vertically extending bellows which form two measuring compartments, an inner one between the two bellows and an outer one surrounding both bellows. The bellows are not coupled by their inner sides, but by means of knee levers extending from their outer sides through the outer compartment and through the partition into the top compartment and operatively connected there. The points at which the coupling means pass through the partition, are sealed gastightly, for instance by means of pliable membranes.

Small capacity meters are provided with two valves cooperating with a double seat, one of the seats being carried directly by the partition. The large capacity meters include six valves with a single seat of which three for the intake of the gas and three for the exhaust, said valves being interconnected through suitable kinematic means.

In order to allow the invention to be more readily understood, reference will be had to accompanying drawings illustrating diagrammatically by way of example two embodiments of my invention. In said drawings:

Fig. 1 shows a vertical section through the axis of the meter.

Fig. 2 is a cross-section through the axis of a valve provided with two seats in the case of a small capacity meter.

Fig. 3 is a plan view of a small capacity meter with two double seated valves.

Fig. 4 is a vertical longitudinal section on the line IV—IV in Fig. 3;

Fig. 5 is a plan view illustrating the arrangement of the six valves of a large capacity meter.

Fig. 6 is a vertical section on the line VI—VI in Fig. 5.

Referring to the drawings and first to Figs. 1 to 4, 1 is a rectangular casing and 2 is a horizontal partition subdividing it into a top compartment 3 and a main space underneath which is subdivided in its turn into an inner measuring compartment 5 and an outer measuring compartment 4 by two bellows consisting of discs 6 and 7 and pliable membrane rings 8 suspended from V-shaped fittings 9. Bent levers 10 and 11 hinged to the outer surfaces of the discs 6 and 7 extend through gas-tight membranes 12, being pivotally mounted at 13 substantially in the plane of the partition 2, and are coupled within the top compartment 3 as shown at 14 to move uniformly for the intake and exhaust of gas into and from the inner compartment 5. Communication between intake piping and port 19 and outlet piping and port 20 and the two measuring compartments 4 and 5 is established in either direction by means of vertically moving double-seat disc valves 15 and 16 connected for alternate lifting and lowering by a rockable balance lever 17. The partition 2 is formed with lower seats 18 for the valves. The valve stems 21 extend through pliable membranes 22 in the tops of the valve boxes 23 and 24 communicating with the outlet 20 and the inlet 19, respectively. All distributing and measuring mechanisms are enclosed in the top compartment 3 which is completely sealed against the entrance of gas.

The gas at intake pressure enters the meter through the piping and port 19 and above the valve 15 (Fig. 4). It immediately fills the valve box 24 under the supple membrane 22 and enters the measuring compartment 4, passing through conduits 51. The gas under pressure in the measuring compartment 4 pushes the two bellows discs 6 and 7 toward the center of the meter. At the same time the gas contained in the measuring compartment 5 is driven at exhaust pressure by the bellows through the orifice of the valve seat 18 and valve box 23 toward the outlet pipe and port 20.

The two discs or bellows 6 and 7 always move in opposite directions by virtue of the knee levers 10 and 11 articulated at 14. Also gas in the side compartments 4 is at the same pressure because these compartments communicate with each other through the conduits 51, 51' in the valve boxes 24, 23, respectively.

When the bellows arrive at the end of their travel at the center of the meter they release, by means of the lever 10, a lever system placed above the horizontal partition 2 and including a spring 52. The spring 52 provides the necessary energy to cause the balance-bar 17 on which the valves are suspended to rock and to reverse the positions of the valves 15 and 16.

This reversal having been accomplished, the gas at intake pressure enters again by the piping and port 19 into the meter and under the valve 15 toward the compartment 5. The bellows are then separated from each other by the entering gas driving gas from the compartment 4 through the conduits 51', above the valve 16 supported on the lower seat 18 and toward the outlet pipe and port 20 of the meter.

At the end of this subsequent movement of the bellows the spring 52 is released again, and the balance-bar and the valves are returned to the previously described starting position. The meter cycle is repeated under the same conditions.

The bellows discs 6 and 7 always move in opposite directions (toward and away from each other) while the lever 17 bearing the valves 15 and 16 swings or rocks on its transverse axis.

A conventional device for counting the volume of gas passed into the meter is driven by the bellows actuated mechanism in a known manner.

The sudden release device including the spring 52 does not form a part of the invention; it is diagrammed in Figs. 1 and 3 each of which shows only a part of this device for greater clarity.

The rocking lever 17 is integral or rigid with a crank 53 oscillatable in bearings 54 and 55. The end 56 of the crank 53 is joined by a connection to a lever 57 pivotally mounted on a horizontal axis 58. The upper part of the lever 10 is joined by a connection 59 to an arm 60 of a balance-bar 61 oscillatable in bearings 62 and 63. The spring 52 is fixed to the end of the lever 57 and to the end of the second arm 64 of the balance-bar 61. The arm 64, the spring 52 and the lever 57 are arranged, in a well known manner, for sudden release devices, so that the lever 57 oscillates suddenly from one extreme position to the other, when the arm 64 rocks during the movement of the lever 10. Lever 57 controls the sudden oscillation or rockings of the lever 17 bearing the valves 15 and 16.

While in small capacity meters only two valves are required, two sets of three levers each are preferably provided in large capacity meters as shown by way of example in Figs. 5 and 6, wherein 31 is the casing, 32 the horizontal partition, 33 the gas-tightly sealed top compartment and 34 and 35 the outer and inner measuring compartments created underneath the partition 32 by the two bellows 36 and 37 coupled for cooperation in the manner described hereinbefore. In each valve box 43 and 44 three single seat disc valves 45, 46 and 47 opening and closing in vertical directions are arranged in juxtaposition with their stems passing through pliable packings 48 as described above for the two-valve meter. The reference characters 49 and 50 indicate respectively the intake exhaust pipings and ports.

The provision of two sets of three single seat valves in connection with large capacity meters renders unnecessary the use of large valve bodies and conduits of large cross section. The cooperation of the three valve sets which are interconnected by suitable mechanisms for alternate opening and closing enables the valve system to be balanced perfectly under any normal gas pressure. The middle valve in each set covers a cross-sectional area of passage of double the size of the two outer valves. The kinematic connection between the two valve sets is so chosen that the rising of the valves in one set is instantaneously accompanied by the lowering of the valves in the other set.

The operation of the meter shown in Figs. 5 and 6 is similar to the operation of the meter shown and described with reference to Figs. 1 to 4.

With the meter elements in the position illustrated in Figs. 5 and 6, it is noted that the outgoing piping for the gases is in communication with the measuring compartment 35 through the seat of the valve 46, the latter being open. The measuring compartment 34 is, on the other hand, in communication with the gas intake piping and port 49. Gas at intake pressure pushes back the bellows 36 and 37 and the gas contained in the compartment 35 is evacuated to the piping and port 50. After the rocking of the valves controlled by one of the levers joined to the bellows and which produces the movements in opposite directions of these bellows (levers similar to the levers 10 and 11 of Fig. 1), gas at intake pressure enters, through the piping and port 49, the compartment 35 and pushes back the bellows 36 and 37 to drive the gas from the compartment 34 through the exhaust piping and port 50. This movement of the bellows 36 and 37 being terminated, the valves are actuated again to resume the position shown in Figs. 5 and 6 for a subsequent meter cycle.

I wish it to be understood that I do not desire to be limited to the details shown and described, for obviously modifications may occur to a person skilled in the art.

I claim:

1. A dry gas meter comprising in combination a case, a horizontal partition in the upper part of said case forming with said case an upper compartment adapted to be free of contact with gas and adapted to house measuring device control elements of the meter, two vertically extending bellows in the lower part of said case facing each other and arranged to be parallel to one side of said case, said bellows dividing said lower part into three sections, one section being between said bellows and one section being on each side of the pair of bellows, a gas intake, a gas outlet, a pair of valve chamber defining boxes in said upper compartment, one chamber communicating with said intake and the other chamber communicating with said outlet, there being ports in each valve chamber connecting said chamber with each of said bellows defined sections, said side sections being in constant free communication with each other through said valve chambers whereby two separate measuring compartments are formed, namely an interior measuring compartment between said bellows and an exterior measuring compartment composed of said side sections, at least one angle lever connected to each of said bellows, each lever being in part located in one of said measuring compartments and passing through said horizontal partition, means pivotally mounting each lever for swinging movement about a horizontal axis in substantially the plane of said partition to permit oscillation of the lever during movement of its corresponding bellows and including means gastightly to seal said levers and said partition where said levers pass therethrough, an articulated connection in said upper compartment to join the end of the angle lever of one bellows to the end of the angle lever of said other bellows so that said bellows can move only in opposite directions relative to each other, valve means in each of said chambers to control the flow of gas through the ports connecting the chambers with said measuring compartments, and means connecting said valve means to one of said angle levers so that said valves are movable to put into communication, alternately, said gas intake with said interior measuring compartment and said exterior measuring compartment with said gas outlet or said gas intake with said exterior measuring compartment and said interior measuring compartment with said gas outlet.

2. A dry gas meter according to claim 1, wherein said valve means comprise a pair of valves in said valve boxes having stems rigid therewith, one of said valves being at said intake, and the other being at said outlet, and a lever rockable about a horizontal axis and interconnecting said valve stems so that said first valve rises from its seat when said second valve approaches its seat and vice versa.

3. A dry gas meter according to claim 1, wherein said valve means comprise two-seat valves in said valve boxes, said inlet and outlet opening between the two seats, the orifice of one seat opening toward said interior measuring compartment, and the orifice of the other seat of the same valve opening toward said exterior measuring compartment.

OCTAVE LEROY.

REFERENCES CITED

The following references are of record in the file of this patent:

UNITED STATES PATENTS

| Number | Name | Date |
|---|---|---|
| 1,522,117 | Gribbel | Jan. 6, 1925 |
| 1,583,040 | Wunsch | May 4, 1926 |
| 1,676,651 | Huettig | July 10, 1928 |
| 1,962,044 | Von Schutz | June 5, 1934 |
| 2,186,307 | Polko et al. | Jan. 9, 1940 |
| 2,283,452 | Molden | May 19, 1942 |

FOREIGN PATENTS

| Number | Country | Date |
|---|---|---|
| 751,759 | France | June 26, 1933 |
| 780,194 | France | Jan. 29, 1935 |